(12) United States Patent
Renock et al.

(10) Patent No.: US 7,208,437 B2
(45) Date of Patent: Apr. 24, 2007

(54) CATALYST AND METHOD FOR ITS MANUFACTURE

(75) Inventors: Devon Renock, Saline, MI (US); Intae Bae, Wrentham, MA (US); Pu Zhang, Ann Arbor, MI (US); Timothy K. Sendek, Huntington Woods, MI (US); Elizabeth Mueller, Westland, MI (US); Hanwei Lei, Albuquerque, NM (US)

(73) Assignee: T/J Technologies, Inc., Ann Arbor, MI (US)

( * ) Notice: Subject to any disclaimer, the term of this patent is extended or adjusted under 35 U.S.C. 154(b) by 12 days.

(21) Appl. No.: 11/035,172

(22) Filed: Jan. 13, 2005

(65) Prior Publication Data

US 2005/0221975 A1    Oct. 6, 2005

Related U.S. Application Data

(60) Provisional application No. 60/537,138, filed on Jan. 16, 2004.

(51) Int. Cl.
*B01J 3/00* (2006.01)

(52) U.S. Cl. ............... 502/117; 502/150; 502/152; 502/154; 502/171; 429/12; 429/40

(58) Field of Classification Search ........... 502/117, 502/150, 152, 154, 171; 429/12, 40
See application file for complete search history.

(56) References Cited

U.S. PATENT DOCUMENTS

| | | | |
|---|---|---|---|
| 4,548,918 A | 10/1985 | Bournonville et al. ...... 502/154 |
| 4,645,752 A | 2/1987 | Dufresne et al. ............ 502/66 |
| 4,794,097 A | 12/1988 | Marty et al. ................ 502/163 |
| 4,851,303 A * | 7/1989 | Madou et al. ............... 429/13 |
| 5,234,768 A * | 8/1993 | Furuya ....................... 428/408 |
| 5,314,760 A * | 5/1994 | Tsou et al. .................. 429/12 |
| 5,316,990 A * | 5/1994 | Cooper et al. ............... 502/5 |
| 5,318,865 A * | 6/1994 | Kaneko et al. ............. 429/345 |
| 5,401,390 A * | 3/1995 | Ferm et al. ................. 208/207 |
| 5,476,596 A * | 12/1995 | Kurek ........................ 210/763 |
| 5,840,264 A * | 11/1998 | Pinnavaia et al. .......... 423/277 |
| 5,885,368 A * | 3/1999 | Lupo et al. ................. 136/263 |
| 5,888,922 A * | 3/1999 | Galperin ..................... 502/163 |
| 5,954,948 A * | 9/1999 | Galperin ................ 208/111.35 |
| 6,028,025 A * | 2/2000 | Ying et al. .................. 502/171 |
| 6,664,071 B1 * | 12/2003 | Windhab et al. ........... 435/7.94 |
| 2004/0010160 A1 | 1/2004 | Coleman et al. ............. 562/17 |
| 2004/0058808 A1 | 3/2004 | Lu et al. ..................... 502/182 |

* cited by examiner

*Primary Examiner*—Anthony J. Green
(74) *Attorney, Agent, or Firm*—Gifford, Krass, Sprinkle, Anderson & Citkowski, P.C.

(57) ABSTRACT

A catalyst is synthesized by a method in which a catalytic metal such as platinum or another noble metal is dispersed onto a support member. A transition metal macrocycle is also adsorbed onto the support, and the support is heat treated so as to at least partially pyrolyze the macrocycle and anchor the transition metal to the support. The catalytic metal is alloyed with the transition metal either during the pyrolysis step, or in a separate step. The catalyst has significant utility in a variety of applications including use as an oxygen reduction catalyst in fuel cells.

24 Claims, No Drawings

CATALYST AND METHOD FOR ITS MANUFACTURE

RELATED APPLICATION

This application claims priority of U.S. Provisional Patent Application Ser. No. 60/537,138 filed Jan. 16, 2004, and entitled "Catalyst and Method for Its Manufacture."

STATEMENT OF GOVERNMENT INTEREST

The invention was made with government support under contract Numbers NSF DMI 011 04419 awarded by the National Science Foundation and NIST 70-NANB 1H3055 awarded by the National Institute of Standards and Technology (Department of Commerce). The government has certain rights in this invention.

FIELD OF THE INVENTION

This invention relates generally to catalysts. More specifically, the invention relates to catalysts comprising transition metals supported on a substrate. Most specifically, the invention relates to catalysts comprising platinum, palladium, and the like, supported on a high surface area substrate.

BACKGROUND OF THE INVENTION

One important group of catalysts comprises transition metals and, in particular, precious transition metals such as platinum and palladium dispersed on a support member such as a body of ceramic, carbon or the like. Such catalysts can be fabricated to have a very high surface area, particularly if the support member is a high surface area material; furthermore, they maximize the use of precious, catalytic metals such as platinum or palladium. In some instances, catalysts of this type employ alloys of platinum or palladium with other transition metals. Supported catalysts are in widespread use in a number of applications; however, there is still a need to improve and optimize catalysts of this type.

Supported, precious metal catalysts often have problems of stability resulting from loss and/or migration of the metal on the surface of the support. In some instances, metal particles can be removed from the support by mechanical and/or chemical actions thereby decreasing the effectiveness of the catalyst. Also, metal particles can move across the surface of the support and agglomerate thereby reducing the effective surface area of the active metals. All of such occurrences decrease the effectiveness of the catalyst. Also, it is generally difficult to provide a fine dispersion of particles having the appropriate size range; consequently, many such supported catalytic materials utilize an excess of platinum or palladium thereby increasing their cost and decreasing their efficiency.

As will be explained hereinbelow, the present invention provides a supported catalytic material in which particles of platinum and the like are firmly anchored to a support substrate via an at least partially pyrolyzed transition metal macrocycle so as to prevent loss and/or agglomeration. The catalysts of the present invention, among other things, have very good tolerance for methanol, which makes them very useful in fuel cell applications. Furthermore, the method and materials of the present invention provide for a very good control of the ultimate particle size of the catalytic material.

While the use of metal macrocycles in connection with the preparation of catalysts is known in the prior art, such prior art processes differ significantly from those of the present invention, and do not produce the materials of the present invention or achieve the benefits thereof. For example, published patent application US 2004/0058808 discloses a process wherein transition metal macrocycles are utilized to prepare a platinum-free catalyst. Published application US 2004/0010160 discloses a process wherein an iron-containing macrocycle is pyrolyzed onto a carbon support. A noble metal is subsequently deposited onto the prepared support, and in an optional step, noble metal may be alloyed with a promoter metal, which may be another noble metal or a transition metal. The promoter metal is separate and distinct from the transition metal which was bonded to the support in the course of its prior preparation.

Details and advantages of the materials and methods of the present invention will be apparent from the discussion, description and examples which follow.

BRIEF DESCRIPTION OF THE INVENTION

Disclosed herein is a method for making a catalyst. According to the method, a catalytic metal, which may be a noble metal such as platinum, is dispersed onto a support member, which, in some embodiments is high surface area carbon. In other instances, the support mg is a ceramic, such as a carbide, lonide, a nitride or an oxide, such as aluminum. A transition metal macrocycle is adsorbed onto the support, and heat treated so as to at least partially pyrolyze the macrocycle, and anchor the transition metal to the support by at least a portion of the macrocycle. The catalytic metal is alloyed with the anchored transition metal so as to produce a catalyst which has the catalytic metal anchored to the substrate via the transition metal with which it is alloyed. In specific embodiments of the invention, the catalytic metal is dispersed onto the support substrate prior to the step of adsorbing the transition metal macrocycle thereonto, and in such instance, the alloying step may be carried out concomitant with the step of heat treating a macrocycle. In other embodiments, the catalytic metal is dispersed onto the substrate concurrent with, or subsequent to, the adsorption of the macrocycle.

In some embodiments, a plurality of different catalytic metals and/or transition metals may be utilized to form the catalyst using the process of the present invention. In specific embodiments of the invention, the transition metal is selected from the group consisting of Fe, Co, Cr and Ni, and in some embodiments the metal macrocycle is a phthalocyanine compound. The step of heat treating the transition metal macrocycle may be implemented in the range of 600–800° C. for a period of time of at least two hours, and may optionally be carried out in an inert atmosphere.

Also disclosed herein are catalysts made according to this method as well as fuel cells which incorporate the catalysts.

DETAILED DESCRIPTION OF THE INVENTION

In accord with the present invention, a supported metal catalyst is prepared by a process in which a transition metal macrocycle is adsorbed onto a high surface area support member such as a body of high surface area carbon. The carbon having the adsorbed macrocycle is heat treated so as to at least partially pyrolyze the macrocycle molecule thereby anchoring the transition metal to the support member. A catalytic metal such as platinum or another noble metal is alloyed with the macrocycle-derived transition metal anchored thereto. In this regard, the catalytic metal may be dispersed onto the substrate prior to, or concurrent with, the step in which the transition metal macrocycle is adsorbed, and in such instance, the alloying will take place when the macrocycle is heat treated. In alternate embodiments, the catalytic metal is dispersed onto the substrate after the macrocycle is adsorbed and heat treated. In any instance, the result is that the catalytic metal is alloyed with the transition metal, which in turn is anchored to the support by the residue of the macrocycle.

The transition metal macrocycle, as is known in the art, comprises a large, generally ring or crown-like molecule such as a phthalocyanine, having a metal atom retained in its central portion, generally by electronic interaction with one or more of nitrogen, oxygen and/or other atoms having an unshared pair of electrons, or delocalized electrons, as for example in a π bond. Other examples of macrocycles include metallocenes, porphyrins, chlorophyll derivatives of imidazoles or pyrroles and the like. While a variety of transition metals may be employed in the practice of the present invention, some particularly preferred transition metals comprise iron, cobalt, chromium and nickel.

Dispersion of the transition metal may be accomplished by dissolving the macrocyclic compound in a solvent, dispersing the support material into the solvent, and evaporating the solvent to provide a support material having the transition metal macrocyclic compound adsorbed thereonto. In other embodiments of the present invention, the adsorption may be accomplished by ball milling the materials together or by evaporating the macrocyclic compound onto the support substrate provided that the macrocyclic compound has sufficient volatility.

Platinum or some other such catalytic metal thereonto is also dispersed onto the substrate for subsequent alloying with the transition metal. In one group of embodiments, this is done before the macrocycle is heat treated. And in specific embodiments, the catalytic metal is dispersed onto the substrate prior to the step of adsorbing the macrocycle. There are a number of techniques well known in the art for dispersing platinum and similar metals onto support substrates. In various of these approaches, a compound of platinum, such as an oxide or hydroxide of platinum, or a compound such as hexachloroplatinic acid is reduced in the presence of the support substrate so as to cause the metal to deposit thereonto. In one specific group of reactions, the platinum compound comprises an oxide of platinum, and the step of reducing the oxide comprises reducing the oxide with a reducing gas such as hydrogen, or with a material such as formaldehyde or formic acid. In those instances where the platinum compound comprises hexachloroplatinic acid, reduction may be advantageously accomplished by the use of sodium borohydride. The platinum compound may be present in a solution which is contacted with reducing agent, or it may be present on the substrate in the form of a solvent-free material. It is also contemplated that dispersion of the platinum may be accomplished by physical processes such as vapor deposition, plasma techniques or the like; or by a process in which a macrocycle or resinate of the catalytic metal is adsorbed onto the substrate and heat treated. In any instance, the result of this step is that a fine dispersion of platinum particles is present on the support member.

In a subsequent step, the support material having the macrocyclic compound adsorbed thereonto is heat treated so as to at least partially break down the macrocyclic compound so as to leave the transition metal anchored to the support by residues of the macrocyclic compound. In those instances where the catalytic metal is already present on the substrate, this heating step can cause the catalytic metal to alloy with the transition metal. Heat treating is typically carried out in an inert, or reducing atmosphere. The temperature employed for the heat treatment will depend upon the nature of the macrocyclic compound; however, in one typical process, the macrocyclic compound comprises a phthalocyanine of iron, cobalt, chromium or nickel, and the heat treatment is carried out at a temperature of approximately 700° C. for at least two hours, in an atmosphere of argons or an argon/hydrogen mixture. The fact that the catalytic metal and the transition metal are present in nanoscale sized particles allows them to alloy at this low temperature. In some instances, alloying of the nanoparticles will take place at temperatures of no more than 350° C.

The result of the alloying process is that there is provided a structure comprising a support member having a fine dispersion of platinum or other such catalytic metal particles anchored thereonto by virtue of being alloyed with a transition metal which in turn is anchored to the support substrate by residues of the heat treated macrocyclic compound. In some instances, the present invention may be employed to prepare catalytic materials comprising an alloy of the catalytic metal with at least two different transition metals. These can be ternary compounds or mixtures of two different binary compounds.

Within the context of the present invention, various catalytic materials may be prepared. The specific composition of the catalyst with depend upon the particular application for which it is optimized. The materials of the present invention have very good utility as catalysts for PEM fuel cells. In this application, the catalysts function as oxygen reduction catalysts. In such applications, the preferred catalytic material is platinum. The catalysts of the present invention may be fabricated to have a very high surface area for the platinum component, and this greatly enhances their activity in fuel cell applications, since the catalytic action is at the surface of the metal. Various catalysts of the present invention selectively catalyze the reduction of oxygen in the presence of methanol and this greatly enhances their utility in direct methanol fuel cell cathodes.

In a typical fuel cell catalyst application, the catalysts of the present invention typically include 5–80% by weight of platinum, and the atomic ratio of the platinum to the transition metal ranges from 4:1 to 1:1. In one specific application, the catalytic material includes, on a weight basis, 10% platinum and 2.5% of Fe or Co, which approximates a 1:1 atomic ratio of the two metals. The present invention allows for very good control of particle size of the catalytic metal. In certain embodiments of this invention, the particle size of the catalytic metal is approximately 3 nanometers. The combination of very high surface area and stability achieved through the use of the present invention makes catalysts of this type very well suited for fuel cell applications.

An illustrative, general method for preparing a catalyst of the present invention will be described herein.

In one general method for the preparation of catalytic materials of the present invention, the process employs a carbon support having platinum dispersed thereupon. This carbon supported platinum may be a commercially obtained product, or it may be prepared as needed utilizing techniques well known in the art. For example, a high surface area carbon such as the material commercially known as Ketjen Black EC300J has 70% by weight of platinum dispersed thereupon by a process wherein chloroplatinic acid is reduced on the substrate. In a typical process, 0.3 grams of the 70% Pt/C is weighed and put into a 150 mL beaker. DI water is added to the beaker in a sufficient amount to completely wet the powder so as to prevent accidental burning of the catalyst during subsequent processing. In the next step a metal macrocycle is added. In one instance, the macrocycle may comprise cobalt phthalocyanine, while in another instance it may comprise the material known in the art as cobalt porphyrin (cobalt II meso-tetramethoxyphenylporphrine). The amount of macrocycle is selected to give a desired molar ratio of Pt:Co. Some specifically employed ratios are 2:1, 3:1 and 4:1. Other molar ratios may also be employed.

In a subsequent step, 60 mL of THF are added to the beaker which is then covered with aluminum foil and sonicated for 15 minutes. Thereafter, further THF is added to take the total volume up to 100 mL, and the mixture is magnetically stirred overnight.

After stirring, the cover is removed from the beaker and the THF solvent is evaporated under a flowing stream of nitrogen while the material is stirred. The final drying is accomplished in a vacuum oven, and it is generally preferable that temperatures employed do not exceed 40° C. so as to avoid burning the catalyst. Drying can be accelerated by maximizing the surface area of the catalyst by breaking up large chunks or clumps with a spatula. When the sample is dry enough that any pieces or chunks break apart freely, the sample is then gently hand ground to a fine powder.

Subsequently, the thus prepared starting material is pyrolyzed. This is accomplished by heat treating the precursor material under a reducing atmosphere in a quartz boat in a clamshell tube furnace (Lindberg) which is equipped with a programmable temperature controller. The reducing atmosphere comprises $H_2/Ar$, and its composition is controlled through the use of a precision mass flow controller (Tylan).

A typical pyrolysis process employs a gas flow of $H_2/Ar$ of 75/175 SCCM. In one heating schedule, the precursor material is heated from a starting temperature of 5° over a period of 15 minutes to a temperature of 150° C. and held at that temperature for 20 minutes. Thereafter, the temperature is raised over a period of 30 minutes to a pyrolysis temperature in the range of 650–750° C., and held at that temperature for approximately 60 minutes. Thereafter, the material is rapidly cooled to room temperature. The cooling can be facilitated by opening the clamshell furnace while maintaining the flow of reducing gas over the material. When the temperature of the reaction material has dropped to 40° C. (typically about 20 minutes), a passivation gas of 99% $He/1\% O_2$ is flowed over the sample for approximately 35 minutes.

X-ray diffraction analysis of material thus prepared shows an average Pt particle size of approximately 13.3 nm, and atomic absorption analysis shows a final Pt loading of approximately 50% when starting with a 70% Pt/C support.

A general procedure for the synthesis of a platinum, cobalt, chromium catalyst supported upon carbon will be described. The process begins with a carbon support, of the type previously employed, having 20% platinum dispersed thereupon. This material may be prepared utilizing the general procedure described above. In a subsequent step, 1.1 g of the 20% Pt/C catalyst is weighed and put into a 150 nl beaker. Co $(NO_3)_2$ and $Cr(NO_3)_3$ are weighed and put into the same beaker so as to form a mixture having an atomic metal ratio (Pt:Co:Cr) varying between 6:1:1 and 1:1:1. This mixture was wetted with several drops of DI water to prevent accidental burning, and approximately 200 ml of ethanol was added to the beaker. The mixture was sonicated for 15 minutes and allowed to stir overnight.

Subsequently, the solvent was removed utilizing a rotary evaporator and a warm water bath (approximately 40–50° C.). Rotary evaporation is carried out until dryness, and the powder removed from the flask and further dried in an oven at 40° C. for approximately 10 hours. The powder was ground in an agate motor and subsequently treated under a reducing atmosphere to form the alloy.

In the reduction step, the material was placed in a tube furnace as described above, under an atmosphere of $H_2/N_2$ (150 sccm/450 sccm). It was heated in a temperature programmed reaction, and a typical heating schedule involves heating the material from 5° C. to 150° C. over a period of 15 minutes, maintaining the material at 150° C. for 20 minutes, and subsequently heating the material from 150° C. to 900° C. over a period of 90 minutes. The material is then held at 900° C. for 15 minutes and rapidly cooled as described above. The material is cooled to 50° C., and under an atmosphere of $He/O_2$ (500 sccm) for 40 minutes to produce the resultant catalyst.

In view of the foregoing, yet other synthetic procedures, including larger scale procedures, will be apparent to those of skill in the art.

The catalyst of the present invention may be manufactured to have, and to maintain, a preferable particle size, typically a particle size in the range of 3–5 microns. By control of the deposition and alloying conditions, other size ranges may also be achieved. The fact that the particles are anchored to the substrate prevents them from being lost, or from further agglomeration, either of which would comprise the efficiency of the catalyst. By the use of the present invention, the deposition and dispersion of the catalytic material may be controlled so as to economize on metal use while maximizing the catalytic efficiency thereof.

In view of the teaching and disclosure presented herein, yet other methods will be obvious to those of skill in the art.

The foregoing has primarily described the present invention with reference to preparation of catalysts for fuel cells. It is to be understood that the catalytic material of the present invention may also be utilized in a variety of other applications including electrochemical applications such as electrolysis and electrochemical synthesis as well as in batteries, sensors and the like. The catalyst of the present invention may also be used in non-electrochemical applications, which include, for example, hydrogenation, catalytic cracking, exhaust gas purification and the like. The specific form and nature of the catalyst will depend upon the particular application.

In view of the teaching and disclosure presented herein, yet other modifications and variations of the invention will be apparent to those of skill in the art. The foregoing discussion, description and examples are illustrative of specific embodiments of the invention, but they are not meant to be limitations upon the practice thereof. It is the following claims, including all equivalents, which define the scope of the invention.

The invention claimed Is:

1. A method for making a catalyst, said method comprising the steps of:
   providing a support member;
   dispersing a catalytic metal onto said support;
   providing a transition metal macrocycle;
   adsorbing said transition metal macrocycle onto the support member;
   heat treating said support material having said transition metal macrocycle adsorbed thereonto, so as to provide a support material having said transition metal anchored thereto by at least a portion of said macrocycle; and alloying at least some of said catalytic metal with the transition metal which is anchored to said support.

2. The method of claim 1, wherein said catalytic metal is a noble metal.

3. The method of claim 1, wherein said transition metal macrocycle comprises a phthalocyanine.

4. The method of claim 1, wherein said transition metal is selected from the group consisting of: Fe, Go, Cr, and Ni.

5. The method of claim 1, wherein said catalytic metal is dispersed onto said support prior to the step of adsorbing said transition metal macrocycle onto said support.

6. The method of claim 5, wherein said step of alloying at least some of said catalytic metal with said transition metal occurs during, and is concurrent with, the step of heat treating said support.

7. The method of claim 1, wherein the step of dispersing said catalytic metal onto said support takes place after said transition metal macrocycle is adsorbed onto said support.

8. The method of claim 1, wherein said step of dispersing said catalytic metal onto said support takes place after the step of heat treating the support having the transition metal macrocycle adsorbed thereonto.

9. The method of claim 1, wherein said step of heat treating said support having said transition metal macrocycle adsorbed thereonto is carried out in an inert atmosphere.

10. The method of claim 1, wherein the step of heat treating said support having said transition metal macrocycle adsorbed thereonto comprises maintaining said support at a temperature in the range of 600–800° C. for at least two hours.

11. The method of claim 1, wherein the step of alloying said catalytic metal with said transition metal comprises heating said support.

12. The method of claim 1, wherein the step of dispersing said catalytic metal onto said support comprises:

contacting said support with a compound of said catalytic metal; and reducing said compound of said catalytic metal so as to deposit particles of said catalytic metal onto the support.

13. The method of claim 12, wherein said catalytic metal is platinum, and said compound of said platinum is selected from the group consisting of: platinum oxide, hexachioroplatinic acid, and combinations thereof.

14. The method of claim 1, wherein said support is carbon.

15. A catalyst, said catalyst comprising:

a support member;

a transition metal bonded to said support member by a process wherein a transition metal macrocycle is adsorbed onto said support and heated so as to bind said transition metal to said support by at least a portion of said macrocycle; and a catalytic metal alloyed with at least some of said bound transition metal.

16. The catalyst of claim 15, wherein said catalytic metal comprises platinum.

17. The catalyst of claim 15, wherein said transition metal is selected from the group consisting of: Fe, Co, Cr, Ni, and combinations thereof.

18. The catalyst of claim 15, wherein said catalytic metal is alloyed with said at least some of the bound transition metal in the form of alloy particles having a size in the range of 3–10 nm.

19. The catalyst of claim 15, wherein said support comprises a porous carbon support.

20. A fuel cell which incorporates the catalyst of claim 15.

21. A method for making a catalyst, said method comprising the steps of:

providing a support member;

dispersing a noble metal catalyst onto the support member;

providing at least one transition metal macrocycle;

adsorbing said at least one transition metal macrocycle onto the support having said noble metal catalyst adsorbed thereonto; and heat treating said support having said transition metal macrocycle adsorbed thereonto so that said macrocycle is at least partially pyrolyzed so that said transition metal is anchored to said support by at least a portion of said macrocycle and so that said precious metal catalyst is alloyed with at least a portion of said transition metal.

22. The method of claim 21, wherein said step of adsorbing at least one transition metal macrocycle onto said support comprises adsorbing macrocycles of at least two different transition metals onto said support.

23. The method of claim 21, wherein the step of heat treating said support comprises heating said support in an inert or reducing atmosphere to a temperature in the range of 600–800° C. for at least two hours.

24. A catalyst made by the method of claim 21.

* * * * *

UNITED STATES PATENT AND TRADEMARK OFFICE
CERTIFICATE OF CORRECTION

| | | |
|---|---|---|
| PATENT NO. | : 7,208,437 B2 | Page 1 of 1 |
| APPLICATION NO. | : 11/035172 | |
| DATED | : April 24, 2007 | |
| INVENTOR(S) | : Devon Renock et al. | |

It is certified that error appears in the above-identified patent and that said Letters Patent is hereby corrected as shown below:

Column 4, line 28, replace "depend" with -- will depend --

Column 7, line 11, replace "Fe, Go, Cr" with -- Fe, Co, Cr --

Signed and Sealed this

Seventh Day of August, 2007

JON W. DUDAS
*Director of the United States Patent and Trademark Office*